UNITED STATES PATENT OFFICE.

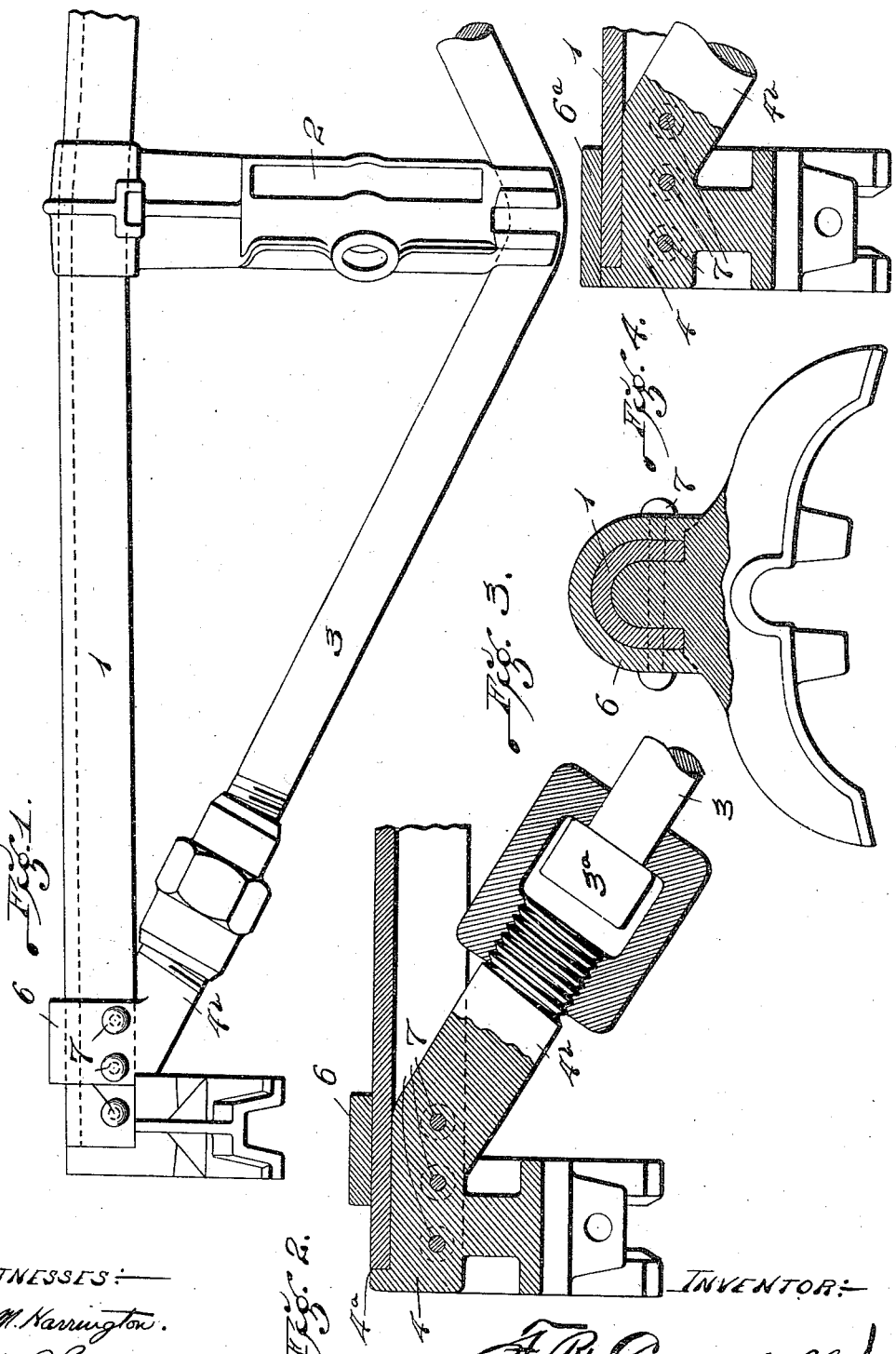

FREDERICK R. CORNWALL, OF ST. LOUIS, MISSOURI, ASSIGNOR TO CHICAGO RAILWAY EQUIPMENT COMPANY, OF CHICAGO, ILLINOIS, A CORPORATION OF ILLINOIS.

BRAKE-BEAM.

966,429.  Specification of Letters Patent.  Patented Aug. 9, 1910.

Application filed August 11, 1909. Serial No. 512,376.

*To all whom it may concern:*

Be it known that I, FREDERICK R. CORNWALL, a citizen of the United States, residing at St. Louis, Missouri, have invented a certain new and useful Improvement in Brake-Beams, of which the following is a full, clear, and exact description, such as will enable others skilled in the art to which it appertains to make and use the same, reference being had to the accompanying drawings, forming part of this specification, in which—

Figure 1 is a plan view of my improved brake beam. Fig. 2 is a sectional view through one end of the same. Fig. 3 is a cross sectional view. Fig. 4 is a sectional view taken through the center of one end of a modified form of my improved beam.

This invention relates to a new and useful improvement in brake beams, and is designed particularly for use as a "high speed" brake beam. These so-called "high speed" brake beams are largely used on passenger coaches, sleeping and dining cars.

The object of my present invention is to materially increase the size of the compression and tension members without increasing the size of the sleeve, whereby the brake heads now in use can be employed on my improved beam. In this manner, I am enabled to get a very strong brake beam, that is, one which will show a minimum deflection under a maximum load.

Heretofore, where the size of the so-called sleeve or thrust block is limited to accommodate brake heads of standard size, such as prescribed by the Master Car Builders, the limit of sizes of compression members and tension members, of various forms, where they pass through the thrust block or sleeve, has been reached. Hence, it has been impossible in existing constructions to get heavier forms of compression and tension members through the restricted space allowed, and consequently, it has been impossible to supply the demand for stronger and more rigid brake beams where the limitation of size concerning the brake head and sleeve remains the same.

My improved construction, while apparently simple, is most important, as it meets recent requirements for increased efficiency in brake beam construction. It is possible, according to my invention to increase the size of the short tension rod, without interfering with the other dimensions, which enables me to get a brake beam of any required capacity.

According to the requirements of the new Westinghouse brake, the brake beam must stand a load of 42,000 pounds, with one sixteenth of an inch ($\frac{1}{16}''$) deflection. This has been thought impossible of attainment, on account of the limitation of the fixed dimensions. In my construction, I can use a tension rod $1\frac{1}{8}$ inches in diameter and increase the size of the compression member, as desired.

In the drawing, 1 indicates the compression member, 2 the strut, and 3 a short tension member, which, as shown in Fig. 1, may be threaded at its ends, or, as shown in Fig. 2 may be provided with a head $3^a$ at each end.

4 is a thrust block shown as a casting, whose front portion is configured to correspond to the well known requirements of a brake head. This thrust block is provided with a shoulder, $4^a$ constituting a seat for the compression member, and also has an inward extension $4^b$ which is preferably threaded and which is bent into alinement with the adjacent end of the tension rod. The thread on the extension $4^b$ and adjacent tension rod may be right and left hand threads, as shown in Fig. 1, to coöperate with nut 5, whereby, when said nut is turned, rod 3 is in tension and a camber is placed in the compression member.

6 indicates a strap integrally connected with the thrust block, embracing the compression member, holding said member to its seat. This strap, as shown in Fig. 2 may be located some distance from the end of the compression member, or as shown in Fig. 4 may be a removable member $6^a$ and located directly over the end of the compression member. If a removable strap $6^a$ is provided over the shoulder $4^a$, or, if said integral strap is located to one side of said shoulder, as shown in Fig. 2, it is possible for a workman to get at the seat of the compression member for the purpose of cutting away or removing any fins or fillets in the casting, which might prevent the compression member from becoming properly seated against the shoulder. Rivets 7 are preferably employed, said rivets extending transversely, for the purpose of securing the compression member in position. I have shown